Patented Mar. 4, 1952

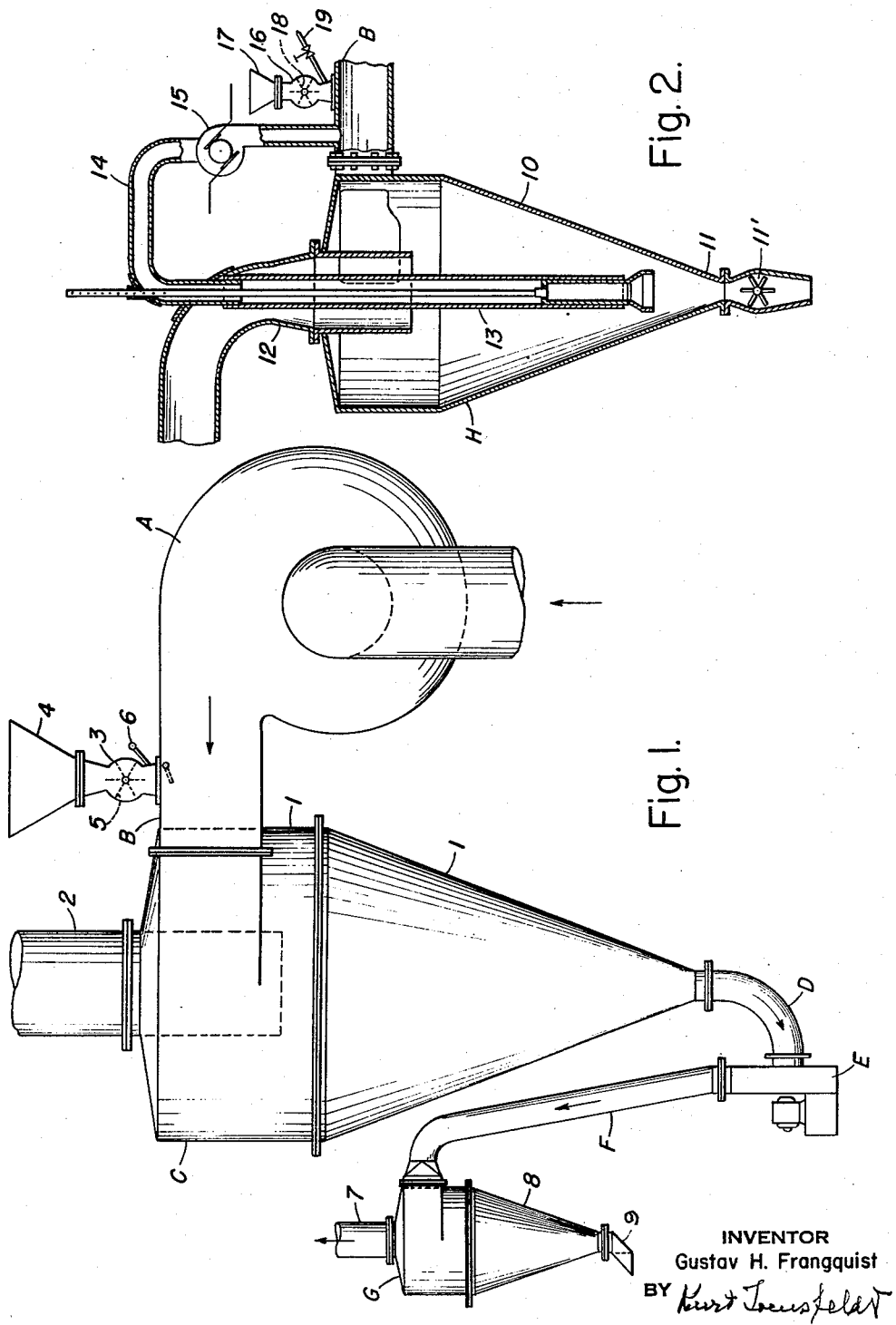

2,588,106

UNITED STATES PATENT OFFICE 2,588,106

METHOD OF SEPARATING DUST FROM A GAS

Gustav H. Frangquist, Chicago, Ill., assignor to Combustion Engineering-Superheater, Inc., a corporation of Delaware Application April 24, 1948, Serial No. 23,109

1 Claim. (Cl. 183—121)

This invention relates to cyclone separators or similar centrifugal separators for removing fine materials from gases and has for its principal object improved method and means for removing a very high percentage of material from the gas.

In centrifugal separators of well known constructions, the gas laden with fine material is introduced tangentially into one end of the separator at a substantial velocity and whirls through the separator. The whirling of the gas causes the entrained material to be moved by centrifugal force toward the wall of the separator while flowing in the direction of gas flow along the wall to an outlet through which the material is removed from the separator. The gas, with most of the material separated out, flows to another outlet, generally at a location remote from the material outlet.

The material while being separated, accumulates in a strata along the wall of the separator and has its maximum density adjacent the wall and concentrates the coarser and heavier material particles nearest the wall. The extremely fine dust-like material entering the separator is very difficult to separate since it is so well dispersed throughout the gas stream and is so easily entrained thereby; its separating-out velocity being less than that of the coarser material.

It is an object of this invention to provide an improved method and means for obtaining an increased efficiency of separation of fine material from gas in cyclone or centrifugal separators.

How the foregoing, together with other objects and advantages as may hereinafter appear or are incident to my invention are realized, is illustrated in preferred form in the accompanying drawings, wherein Figure 1 shows a general arrangement of a system embodying my invention;

Figure 2 shows a conical cyclone separator embodying my invention; and

Figure 3:
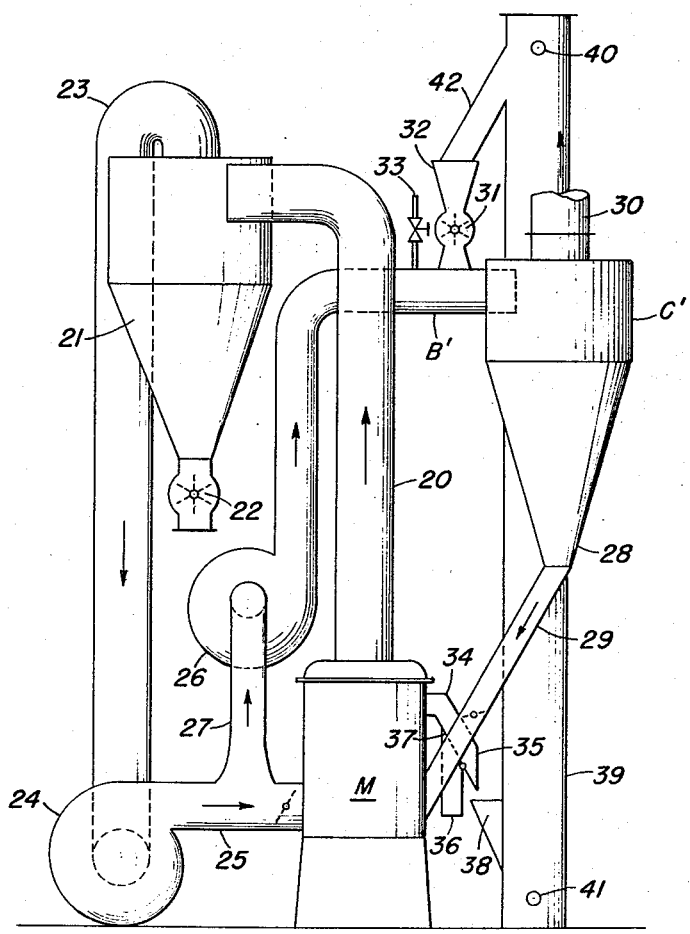
Figure 3 shows my invention applied to pulverizing apparatus included in a closed circuit system.

Referring to Figure 1, the system there shown comprises in general an exhauster A which withdraws a material-laden gas from a source of supply and delivers it through a conduit B into a conical cyclone concentrator C. The material separated from the gas within the concentrator C is removed via a conduit D by a fan E, being concentrated in a small amount of the gas, and is delivered via conduit F into a conical cyclone separator G. The gas freed of material flows through outlets from the tops of both the concentrator C and the separator G.

The centrifugal separator C, in this instance a concentrator, is of the well known conical cyclone type into which the material laden gas is tangentially introduced at the top through conduit B. The entering velocity of the material laden gas causes it to whirl downwardly through the separator in helical or vortical flow. The whirling gas causes the entrained material to be moved by centrifugal force toward the casing 1 of the separator while flowing in the direction of gas flow along the casing to the concentric material outlet conduit D. The gas with substantially all of the material separated out, whirls centrally upwardly through the separator and out through conduit 2. Gas outlet conduit 2 extends downwardly (as indicated by the dotted outline) into the upper end of the separator C and is concentric with the casing 1.

In accordance with my invention there is mounted on inlet conduit B a rotary feeder 3 surmounted by a hopper 4 by which coarse material may be fed (for a beneficial purpose later to be explained) into the material-laden gas entering the separator C. The feeder shown at 3 is of the well known type in which a star wheel 5 delivers the material from the hopper into the conduit B. A valved pipe 6 may be connected into the discharge of the feeder 3 through which moisture, such as in the form of steam, may further be introduced into the entering material-laden gas.

In this illustrative apparatus of Figure 1 the separated material is withdrawn from the concentrator C through conduit D and is entrained by and concentrated in a small amount of the gas flowing through the concentrator C. By so withdrawing the separated material, the efficiency of separation within the concentrator C is materially improved. The material laden gas withdrawn through conduit D is then delivered by fan E via conduit F into a second cyclone separator G in which the final separation of material from gas takes place. Because of the relatively small amount of heavily material-laden gas that is passed through separator G its efficiency of separation is high. If desired, the gas outlet conduit 7 from separator G may be connected into the inlet conduit B of concentrator C so that any material entrained through outlet conduit 7 may be reprocessed through the system.

As here shown the separator G is of a well known conical cyclone type into which the material laden gas is introduced tangentially at the top through conduit F. The entering velocity of the material laden gas causes it to whirl downwardly through the separator in helical or vortical flow. The whirling gas causes the entrained material to be moved by centrifugal force toward the casing 8 of the separator while flowing in the direction of gas flow along the casing 8 to the concentric material outlet conduit 9. The gas with substantially all the material separated out, whirls centrally upwardly through the separator G and out through conduit 7. Gas outlet conduit 7 extends centrally downward into the upper end of separator G and is concentric with the casing 8.

During operation of separator apparatus such as that shown in Figure 1, extremely fine dust-like material entering the concentrator C via conduit B proves very difficult to separate since it is so well dispersed throughout the gas stream and is so easily entrained thereby, and also because its separating-out velocity is substantially less than that of coarser material. Consequently, a certain portion of the extreme fines is found to be entrained by the gas leaving the concentrator via outlet 2 and the efficiency of separation is correspondingly impaired; particularly is this the case where the gas that enters concentrator inlet B has a low grain loading, as expressed in grains of material per cubic foot of gas.

My invention eliminates impairment of efficiency from causes such as the above. It is predicated on my discovery that by introducing into the gas flowing through device C of Figure 1 (or other equivalent separator, a granular material of a grain size larger than the extreme fines those fines will then agglomerate with the introduced coarser particles and thereupon separate out of the gas in adherence to those coarser particles. In the system of Figure 1 the named introduction may satisfactorily be into concentrator C's main inlet B through the feeder 3 and hopper 4 earlier described; moreover, the coarse grains so introduced may be some of the material previously separated in the concentrator C or they may be other material.

In making the present invention I have further discovered that the efficiency of separation may additionally be increased if moisture in limited amount is introduced into the gas laden with the material which enters the separator or concentrator. In the system of Figure 1 such moisture may satisfactorily be introduced into concentrator C's main inlet through the steam pipe 6 earlier described; its effect then is to aid in the agglomeration of the fines with the larger material particles and thereby further enhance separator efficiency. Such tendency as the moistened fines may have to adhere to the wall of concentrator C is effectively overcome by the increased loading in the gases of coarse material grains whose presence causes a greater scrubbing of the wall and thereby keeps it clean.

Apparatus other than the concentrator C of Figure 1 also may be benefitted by the improvements of my invention. Figure 2 shows one example of such other apparatus in the form of a conical separator H similar to separator G in which the material laden gas is delivered tangentially into the separator by conduit B and thence whirls downwardly in a helical path adjacent the casing 10 of the separator. The material is separated out by centrifugal force and moves toward the casing 10 while flowing in the direction of gas flow downwardly along the casing 10 toward an outlet 11 at the bottom of the separator. The separated material is removed through a rotary air lock 11' of a well known type and similar in construction to the rotary feeder 3.

At the upper end of this Figure 2 separator is a gas outlet conduit 12 which extends downwardly into the upper end of the separator H and is concentric with the separator casing 10. Concentrically within the outlet conduit 12 and the separator casing 10 is a second and smaller conduit 13 which extends downwardly through the separator axially thereof to within a spaced distance of the bottom outlet 11. The upper portion of the inner conduit 13 is connected by a conduit 14 to a fan 15 which induces a circulation of gas through said conduits from the bottom of the separator H and into the inlet conduit B of the separator H.

The function of this inner conduit 13 is to withdraw a portion of the gas from the bottom of the separator which contains the finest dust particles and to return them for retreatment within the separator. Such a separator with inner conduit is disclosed in the patent to Joe Crites No. 2,408,250 of September 24, 1946; obviously, however, the application of my invention is not limited to this Crites type of cyclone but may be used as well in conjunction with the usual cyclone in which the inner conduit 13 is omitted.

In accordance with my invention there is mounted on inlet conduit B of the Figure 2 separator a rotary feeder 16 surmounted by a hopper 17 by which coarse material may be fed (for the beneficial purpose later discussed) into the material laden gas entering the separator H. The feeder shown at 16 is of the well known type in which a star wheel 18 delivers material from the hopper 17 into the conduit B; in addition there may be connected into the discharge of the feeder 16 a valved pipe 19 through which moisture such as in the form of steam may be added to the entering material laden gas.

In the cyclone separator system of Figure 2 coarse grained material introduced through hopper 17 and feeder 16 into inlet conduit B has the same beneficial effect as earlier described in connection with Figure 1; namely, the coarse grains so introduced constitute nuclei around which the extreme fines agglomerate thereby enabling their subsequent separation out of the gas in adherence to those coarser particles. Again, the coarse grains so introduced may be of the material previously separated in the cyclone H or they may be other material; moreover, the named introduction may be accompanied by admission through pipe 19 of moisture (such as steam) which aids the fines in agglomerating with the larger particles.

Figure 3 shows the application of my invention to a mill system which comprises in general a pulverizing mill M within which material is ground and from which the sufficiently ground material is withdrawn in flotation in a current of air through conduit 20 and delivered from conduit 20 into separator 21 to be therein separated from the air in a manner similar to that in which the separation occurs in separator G. The separated material is removed through a rotary air lock 22 of a well known type, similar in construction to the rotary feeder 3, and the air containing some of the unseparated finer material is withdrawn through conduit 23 by fan 24 and delivered back into the mill through conduit 25. A second fan 26 removes a portion of the air from conduit 25 via conduit 27 and delivers it through conduit B' into a second separator or concentrator C'.

Concentrator C' is similar in construction to concentrator C of Figure 1 and the description of the manner of separation of material and air within the concentrator C applies as well to concentrator C'. The separated material flows from the concentrator C' into the material outlet 28 and thence via duct 29 back into the mill M to be reground. The separated air flows from the concentrator C' through conduit 30 to the atmosphere.

In accordance with my invention there is mounted on inlet conduit B' of the Figure 3 separator C' a rotary feeder 31 surmounted by a hopper 32 by which coarse material may be fed (for the beneficial purpose later discussed) into the material-laden gas entering the separator C'. The feeder shown at 31 is of a well known type similar in construction to the rotary feeder 3 of Figure 1; in addition there may be connected into the conduit B' supplied by feeder 31 a valved pipe 33 through which moisture, such as in the form of steam, may be introduced into the material-laden gas.

In this illustrative apparatus of Figure 3, the pulverizing mill M may be provided with a duct 34 connected into the mill casing above the grinding elements, through which coarse, insufficiently ground material is rejected from the mill. The provision of such a reject mechanism is well known on the so called "Raymond" mill and is disclosed in the U. S. patent to Cook No. 2,200,489. Duct 34 divides into branches 35 and 36 and is provided with a flap damper 37 by means of which the coarse material leaving the mill and flowing through duct 34 may be directed either via branch duct 35 into a hopper 38 of an elevator 39 or may be disposed of otherwise through branch duct 36. In the position shown, flap damper 37 directs the rejected coarse material into said hopper 38.

In this Figure 3 system the elevator 39 may be of the well known bucket type in which a multiplicity of buckets are connected to an endless chain rotating over sprockets (all not shown) about top and bottom shafts 40 and 41. The entire bucket mechanism is enclosed within a housing as shown. After being elevated from hopper 38 to the top of elevator 39 the coarse material is discharged through spout 42 into the hopper 32 of the material feeding device mounted on conduit B'.

From hopper 32 of Figure 3 the named coarse material (delivered to that hopper from mill M via elevator 39) is introduced into gas conduit B' for flowing into separator C' where it has the same beneficial effect as earlier described in connection with Figures 1 and 2; namely, the coarse grains so introduced constitute nuclei around which the extreme fines agglomerate thereby enabling their subsequent separation out of the gas in adherence to those coarser particles. As in Figures 1 and 2, the named introduction may be accompanied by admission through pipe 33 of moisture (such as steam) which aids the fines in agglomerating with the larger particles.

In each of the systems of Figures 1, 2 and 3, certain fine materials may tend to adhere to the wall of the illustrated cyclone separator, particularly when they contain some moisture; however, in all instances the increased coarser granular material loading of the gas resulting from the practice of my invention causes a greater scrubbing of the separator wall and thereby serves to keep it clean.

Preferably (as earlier indicated) the granular material is added to the separator by introducing it into the incoming material laden gas stream as shown, and the moisture may be conveniently added at the same location; however, it will be understood that either or both of these may be effectively introduced in other locations without departing from the spirit and scope of the invention as claimed.

I claim:

The method of separating suspended extreme fines from a moving dust laden gaseous fluid by introducing coarse particles and moisture into said moving fluid to be carried in suspension therein; by subjecting said dust laden fluid and coarse particles plus moisture to a whirling motion within a chamber whereby to cause turbulence and intimate mixing of said gaseous fluid and said coarse particles plus moisture and agglomeration of the aforesaid extreme fines suspended in said gaseous fluid around said coarse particles; and by subjecting said gaseous fluid and coarse particle mixture to the action of a centrifugal force thereby causing the separation from said fluid of the aforesaid coarse particles and extreme fines adhering thereto.

GUSTAV H. FRANGQUIST.

REFERENCES CITED

The following references are of record in the file of this patent:

UNITED STATES PATENTS

| Number | Name | Date |
|---|---|---|
| 840,301 | Cook | Jan. 1, 1907 |
| 1,734,677 | Kreisinger | Nov. 5, 1929 |
| 2,391,863 | Bowen | Jan. 1, 1946 |
| 2,408,250 | Crites | Sept. 24, 1946 |

FOREIGN PATENTS

| Number | Country | Date |
|---|---|---|
| 336,201 | Great Britain | Oct. 6, 1930 |
| 384,120 | France | Jan. 27, 1908 |
| 32,674 | Norway | July 18, 1921 |